United States Patent
Hershman et al.

(10) Patent No.: US 9,703,945 B2
(45) Date of Patent: Jul. 11, 2017

(54) SECURED COMPUTING SYSTEM WITH ASYNCHRONOUS AUTHENTICATION

(71) Applicant: Nuvoton Technology Corporation, Hsin-chu (TW)

(72) Inventors: Ziv Hershman, Givat Shmuel (IL); Valery Teper, Petach-Tikva (IL); Moshe Alon, Tel-Aviv (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 858 days.

(21) Appl. No.: 13/965,256

(22) Filed: Aug. 13, 2013

(65) Prior Publication Data

US 2014/0082721 A1    Mar. 20, 2014

Related U.S. Application Data

(60) Provisional application No. 61/702,763, filed on Sep. 19, 2012.

(51) Int. Cl.
| | |
|---|---|
| *H04L 29/06* | (2006.01) |
| *G06F 21/44* | (2013.01) |
| *G06F 21/52* | (2013.01) |
| *G06F 21/84* | (2013.01) |

(52) U.S. Cl.
    CPC .............. *G06F 21/44* (2013.01); *G06F 21/52* (2013.01); *G06F 21/84* (2013.01)

(58) Field of Classification Search
    CPC ................................. H04L 63/00; G06F 21/00
    See application file for complete search history.

(56) References Cited

U.S. PATENT DOCUMENTS

| 4,521,853 A | 6/1985 | Guttag |
|---|---|---|
| 5,671,283 A | 9/1997 | Michener et al. |
| 5,703,952 A | 12/1997 | Taylor |
| 6,272,637 B1 | 8/2001 | Little et al. |
| 6,915,175 B2 | 7/2005 | Ahn |
| 6,976,136 B2 | 12/2005 | Falik et al. |

(Continued)

FOREIGN PATENT DOCUMENTS

| AU | 2001027074 B2 | 7/2001 |
|---|---|---|
| EP | 1615370 A1 | 1/2006 |

(Continued)

OTHER PUBLICATIONS

U.S. Appl. No. 14/467,077 Office Action dated Sep. 30, 2015.

(Continued)

*Primary Examiner* — Joseph P Hirl
*Assistant Examiner* — Leynna Truvan
(74) *Attorney, Agent, or Firm* — D. Kligler IP Services Ltd.

(57) ABSTRACT

A computing device includes an input bridge, an output bridge, a processing core, and authentication logic. The input bridge is coupled to receive a sequence of data items for use by the device in execution of a program. The processing core is coupled to receive the data items from the input bridge and execute the program so as to cause the output bridge to output a signal in response to a given data item in the sequence, and the authentication logic is coupled to receive and authenticate the data items while the processing core executes the program, and to inhibit output of the signal by the output bridge until the given data item has been authenticated.

24 Claims, 4 Drawing Sheets

(56) References Cited

U.S. PATENT DOCUMENTS

| | | |
|---|---|---|
| 7,082,539 B1 | 7/2006 | Kitahara et al. |
| 7,194,626 B2 | 3/2007 | Craft |
| 7,248,696 B2 | 7/2007 | Craft et al. |
| 7,269,747 B2 | 9/2007 | Catherman et al. |
| 7,739,565 B1 | 6/2010 | Lesea |
| 7,826,271 B2 | 11/2010 | Cernea |
| 7,836,269 B2 | 11/2010 | Obereiner et al. |
| 7,881,094 B2 | 2/2011 | Chen |
| 7,882,365 B2 | 2/2011 | Natarajan et al. |
| 7,889,592 B2 | 2/2011 | Kim |
| 8,041,032 B2 | 10/2011 | Katoozi et al. |
| 8,108,941 B2 | 1/2012 | Kanai |
| 8,140,824 B2 | 3/2012 | Craft |
| 8,225,182 B2 | 7/2012 | Kagan et al. |
| 8,312,294 B2 | 11/2012 | Sato et al. |
| 8,427,194 B2 | 4/2013 | Deas et al. |
| 8,429,513 B2 | 4/2013 | Smith et al. |
| 8,549,246 B2 | 10/2013 | Pekny et al. |
| 8,576,622 B2 | 11/2013 | Yoon et al. |
| 8,578,179 B2 | 11/2013 | Aciicmez et al. |
| 8,745,408 B2 | 6/2014 | Mangard |
| 8,756,439 B1 | 6/2014 | Jannson et al. |
| 8,781,111 B2 | 7/2014 | Qi et al. |
| 8,832,455 B1 | 9/2014 | Drewry et al. |
| 2002/0164022 A1 | 11/2002 | Strasser et al. |
| 2003/0005453 A1 | 1/2003 | Rodriguez et al. |
| 2003/0084285 A1 | 5/2003 | Cromer et al. |
| 2003/0084346 A1 | 5/2003 | Kozuch et al. |
| 2003/0097579 A1 | 5/2003 | England et al. |
| 2003/0200026 A1 | 10/2003 | Pearson |
| 2004/0218900 A1 | 11/2004 | Yoon et al. |
| 2004/0260932 A1 | 12/2004 | Blangy et al. |
| 2005/0024922 A1 | 2/2005 | Li et al. |
| 2005/0039035 A1 | 2/2005 | Clowes |
| 2005/0058285 A1 | 3/2005 | Stein et al. |
| 2005/0114687 A1 | 5/2005 | Zimmer et al. |
| 2005/0123135 A1* | 6/2005 | Hunt .......... H04N 5/913 380/200 |
| 2006/0026418 A1 | 2/2006 | Bade et al. |
| 2006/0026693 A1 | 2/2006 | Bade et al. |
| 2006/0059553 A1 | 3/2006 | Morais et al. |
| 2006/0107054 A1 | 5/2006 | Young |
| 2006/0253708 A1 | 11/2006 | Bardouillet et al. |
| 2007/0133437 A1* | 6/2007 | Wengrovitz ........ H04M 3/56 370/260 |
| 2007/0192592 A1 | 8/2007 | Goettfert et al. |
| 2008/0155273 A1 | 6/2008 | Conti |
| 2009/0217377 A1 | 8/2009 | Arbaugh et al. |
| 2009/0327633 A1 | 12/2009 | Fusella et al. |
| 2010/0070779 A1 | 3/2010 | Martinez et al. |
| 2010/0098247 A1 | 4/2010 | Suumaki |
| 2010/0106920 A1 | 4/2010 | Anckaert et al. |
| 2010/0146190 A1 | 6/2010 | Chang |
| 2010/0158242 A1 | 6/2010 | Asher |
| 2010/0169654 A1 | 7/2010 | Kiel et al. |
| 2011/0185435 A1 | 7/2011 | Chang |
| 2011/0283115 A1 | 11/2011 | Junod |
| 2011/0285421 A1 | 11/2011 | Deas et al. |
| 2012/0102307 A1 | 4/2012 | Wong |
| 2012/0204056 A1 | 8/2012 | Airaud et al. |
| 2012/0275595 A1 | 11/2012 | Emelko |
| 2013/0145177 A1 | 6/2013 | Cordella et al. |
| 2013/0262880 A1 | 10/2013 | Pong et al. |
| 2013/0339730 A1 | 12/2013 | Nagai et al. |
| 2013/0339744 A1 | 12/2013 | Nagai et al. |
| 2014/0143883 A1 | 5/2014 | Shen-Orr et al. |
| 2014/0281564 A1 | 9/2014 | Nagai et al. |
| 2015/0074406 A1 | 3/2015 | Nagai et al. |

FOREIGN PATENT DOCUMENTS

| | | |
|---|---|---|
| EP | 2566096 A2 | 3/2013 |
| TW | 201305842 A | 2/2013 |
| TW | 201502854 A | 1/2015 |
| WO | 2013035006 A1 | 3/2013 |

OTHER PUBLICATIONS

U.S. Appl. No. 14/311,396 Office Action dated Sep. 8, 2015.
U.S. Appl. No. 15/004,957 Office Action dated Feb. 24, 2016.
U.S. Appl. No. 14/301,456 Office Action dated Dec. 22, 2015.
KR Application # 10-2014-0125216 Office Action dated Feb. 16, 2016.
TCG PC Specific Implementation Specification, Version 1.1, 72 pages, Aug. 18, 2003.
TCG PC Client Specific Implementation Specification for Conventional Bios, Version 1.20 Final Revision 1.00, 1.2; Level 2, 119 pages, Jul. 13, 2005.
TCG PC Client Specific TPM Interface Specification (TIS), Specification Version 1.21 Revision 1.00, 103 pages, Apr. 28, 2011.
TPM Main Part 1 Design Principles, Specification Version 1.2 ,Revision 62, 150 pages, Oct. 2, 2003.
Java Security Architecture, 62 pages, Dec. 6, 1998.
Zhuang, H.,"Hide: An Infrastructure for Efficiently Protecting Information Leakage on the Address Bus", Proceedings of the 11th international conference on Architectural support for programming languages and operating systems (ASPLOS'04), pp. 72-84, Boston, USA, Oct. 9-13, 2004.
U.S. Appl. No. 14/702,791 Office Action dated Jun. 16, 2016.
U.S. Appl. No. 15/181,427 Office Action dated Jan. 13, 2017.

* cited by examiner

SECURED COMPUTING SYSTEM WITH ASYNCHRONOUS AUTHENTICATION

CROSS-REFERENCE TO RELATED APPLICATIONS

This application claims the benefit of U.S. Provisional Patent Application 61/702,763, filed Sep. 19, 2012, whose disclosure is incorporated herein by reference.

FIELD OF THE INVENTION

The present invention relates generally to computing systems, and particularly to methods and systems for secured execution of programs stored in external devices.

BACKGROUND

In secured computing systems, a secured computing device often communicates with one or more external devices. An external device typically comprises at least a memory device that stores program instructions to be executed by a processing core within the computing device. In cases in which the communication link between the computing device and the external devices is not secured, the secured computing device is often required to validate the integrity and authenticity of data received over the link. Authenticity validation means that a receiving device (e.g., a secured computing device) can verify that the data was sent from a legitimate source (e.g., an authorized memory device). Integrity means that the data was not altered before input to the receiving device. In the description that follows, and in the claims, the term "authentication" collectively refers to techniques that validate either data authenticity or integrity or both.

Methods for authentication of code and data stored in a device external to the computing environment are known in the art. For example, U.S. Patent Application Publication 2010/0070779, whose disclosure is incorporated herein by reference, describes a method for protecting the integrity of data ciphered by a ciphering algorithm providing at least an intermediary state meant to be identical in ciphering and in deciphering, this intermediary state being sampled during the ciphering to generate a signature. The disclosure more specifically applies to the protection of the privacy and of the integrity (or authenticity) of the content of a memory external to an integrated circuit considered as secure.

U.S. Pat. No. 8,108,941, whose disclosure is incorporated herein by reference, describes a processor, connected to a non-volatile memory storing first memory authentication information for authentication of the non-volatile memory. The processor includes an operation unit configured to perform an operation utilizing information stored in the non-volatile memory, an authentication memory formed integrally with the operation unit, and storing second memory authentication information for authentication of the non-volatile memory, an authentication information acquiring unit configured to acquire the first memory authentication information from the non-volatile memory, a memory authenticating unit configured to compare the first memory authentication information and the second memory authentication information to authenticate the non-volatile memory, and a memory access controlling unit configured to permit an access to the non-volatile memory when the memory authenticating unit succeeds in authentication.

U.S. Pat. No. 8,140,824, whose disclosure is incorporated herein by reference, describes a computer program product comprising a computer useable medium having a computer readable program for authentication of code, such as boot code. A memory addressing engine is employable to select a portion of a memory, as a function of a step value, as a first input hash value. The step value allows for the non-commutative cumulative hashing of a plurality of memory portions with a second input hash value, such as a previous hash value that has been rotated left. An authenticator circuit is employable to perform a hash upon the portion of memory and the second input hash value. A comparison circuit is then employable to compare an output of the authenticator circuit to an expected value.

SUMMARY

An embodiment of the present invention provides a computing device including an input bridge, an output bridge, a processing core, and authentication logic. The input bridge is coupled to receive a sequence of data items for use by the device in execution of a program. The processing core is coupled to receive the data items from the input bridge and execute the program so as to cause the output bridge to output a signal in response to a given data item in the sequence, and the authentication logic is coupled to receive and authenticate the data items while the processing core executes the program, and to inhibit output of the signal by the output bridge until the given data item has been authenticated.

In some embodiments, the data items include program instructions and the given data item includes an output instruction, and the processing core is configured to execute the program by executing the program instructions, including the output instruction. In other embodiments, the authentication logic is configured to authenticate the data items asynchronously with execution of the program by the processing core. In yet other embodiments, the authentication logic is configured to authenticate the given data item after the given data item has been used in executing the program by the processing core, and to delay the output of the signal by the output bridge until authentication of the given data item has been completed.

In an embodiment, the authentication logic is configured to authenticate the data items by calculating one or more digital signatures of the data items and comparing the calculated signatures to respective original signatures received by the device via the input bridge. In another embodiment, the authentication logic is configured to generate an alert signal if at least one of the calculated signatures does not match the respective original signature. In yet another embodiment, the input bridge is configured to receive the data items by receiving first and second blocks of data items, and receiving the second block is enabled only after authenticating all the data items of the first block using the authentication logic.

There is additionally provided, in accordance with an embodiment of the present invention a method including, receiving in a computing device via an input bridge a sequence of data items for use in execution of a program by a processing core of the device, executing the program by the processing core so as to cause a signal to be output from the device in response to a given data item in the sequence, and authenticating the data items using authentication logic while the processing core executes the program, and inhibiting output of the signal until the given data item has been authenticated.

There is additionally provided, in accordance with an embodiment of the present invention a computing system including, an external device and a computing device. The external device is configured to provide a sequence of data items, and the computing device further includes an input bridge, an output bridge, a processing core, and authentication logic. The input bridge is coupled to receive from the external device the sequence of data items for use by the computing device in execution of a program. The processing core is coupled to receive the data items from the input bridge and execute the program so as to cause the output bridge to output a signal in response to a given data item in the sequence, and the authentication logic is coupled to receive and authenticate the data items while the processing core executes the program, and to inhibit output of the signal by the output bridge until the given data item has been authenticated.

The present invention will be more fully understood from the following detailed description of the embodiments thereof, taken together with the drawings in which:

DETAILED DESCRIPTION OF EMBODIMENTS

Overview

Figure 1:
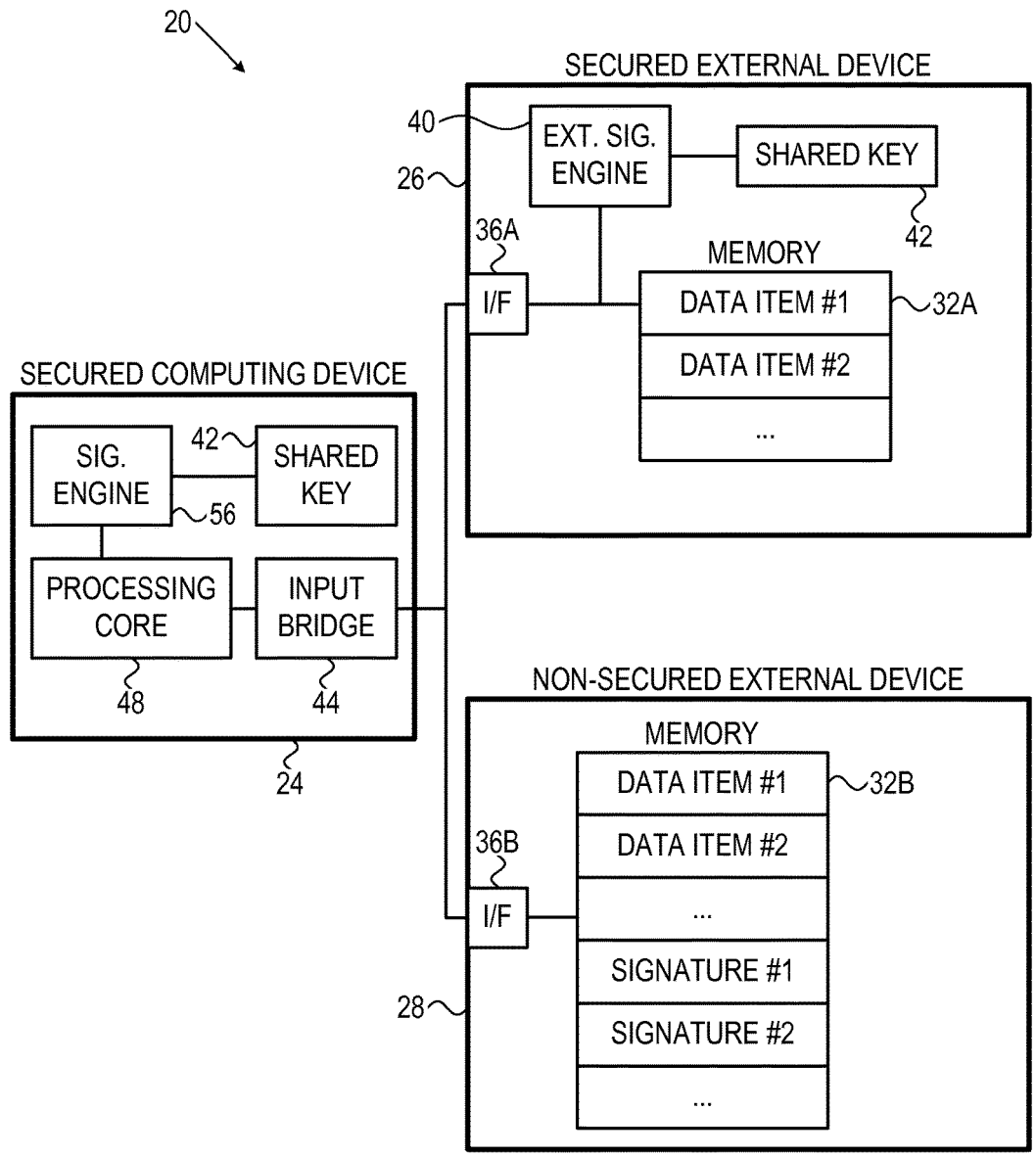
FIG. 1 is a block diagram that schematically illustrates a secured computing system, in accordance with an embodiment of the present invention.

Secured computing systems that accept data (also referred to as a message) from an external source, are often required to validate the integrity and authenticity of the data before using it internally. Embodiments of the invention presented below make use of digital signatures for data authentication. A digital signature typically comprises a bit-string that is stored with the data or generated in real time at the sender side (e.g., a memory device) and sent to the recipient (e.g., a secured computing device) along with the data for authentication. The recipient calculates a signature of the received data and compares the calculated signature to the original signature of the sender. If the signatures match, the recipient can assume that the data is authentic and was not altered by any unauthorized party.

In many cases, the generation and validation of signatures is based on the data message and on a secret key. Algorithms that generate signatures are typically designed such that it is infeasible for an unauthorized party to generate valid signatures without full knowledge of the secret key. Additionally, any change to the data message (i.e., breaking the data integrity) results in signature verification failure at the recipient side.

Various methods are known in the art for generation and validation of signatures using secret keys. For example, a sender can generate a signature using a private key, whereas the recipient validates the signature using a public key. As another example, both sender and recipient can share a common key that is kept secret between them. Methods for key exchange between a recipient and a sender are known in the art. After validating a signature that corresponds to certain data (assuming that the secrecy of the key has not been breached), the secured computing device can safely process the received data. For example, when the data comprises computer program instructions, the computing device can safely execute the authenticated program without risk of exposing secured information.

In terms of security, unauthenticated program instructions and other data items that affect the processing inside the computing device can be classified into two categories for purposes of embodiments of the present invention. Processing unauthenticated data items of the first category does not expose any secured information, and data items in this category are therefore referred to as neutral instructions or data items. On the other hand, processing unauthenticated data items of the second category may cause secret or secured information to be exposed directly or indirectly. Data items of the second category are also referred to herein as output instructions.

Embodiments of the present invention that are described herein provide improved methods and systems for authentication in a secured computing device. In an example embodiment, a processing core in a computing device receives program instructions for execution from an external device, such as a memory, via an input bridge. The instructions are signed with a digital signature. Some of the instructions (i.e., output instructions) may cause the processing core to output information via an output bridge. The terms "input bridge" and "output bridge" are used herein broadly to refer to any and all connections through which the computing device may receive or transmit signals, respectively. In the description that follows and in the claims, the term "signals" refers to any channel that carries information into or out of the device, whether via a physical signal connection or not. Examples of non-physical signal channels include signals that can be picked up in side-channel attacks, such as voltage patterns over power lines, changes in electro-magnetic emission and secured information that may be exposed by an attacker performing conditional reset operations.

Instructions received through the input bridge are authenticated by dedicated authentication logic within the computing device. Authentication can be carried out in parallel with execution by the processing core of at least parts of the program. When the processing core encounters an output instruction that is not yet authenticated, the authentication logic inhibits the output bridge, and delays actual output of signals until the current output instruction and all the instructions preceding it are authenticated. Thus, performance is maximized by avoiding unnecessary delays of execution while waiting for authentication, while preventing unintended exposure of secret information.

In an embodiment, the external device comprises an unsecured memory device. A selected share of the memory capacity is used for storing signatures that correspond to memory data blocks. The computing device receives data and respective signature or signatures from the memory device and authenticates the signed blocks. Received data can be stored in a cache prior or in parallel to being executed by the processing core, and re-fetching of data from the external device occurs upon a cache miss event. Instead of working in a single block fetch-authenticate cycle, the computing device operates in a mode wherein multiple signatures are calculated, stored, and verified upon fetching multiple data blocks. This operational mode enhances the computing device efficiency.

In another embodiment, the external device comprises a secured memory device, equipped with a signature engine. The secured external device shares a secret key with the computing device and is capable of generating, maintaining and sending data signatures to the computing device. The data signatures may be generated by calculating a message digest over one or more (e.g., block-based) data items and/or address and/or control signals delivered over the device interface. A secret key can be used as a seed for generating a pseudo-random sequence to be blended with the message digest. Alternatively, the message digest can be encrypted with a suitable secret key to generate the signature.

Scheduling alternatives for sending data signatures to the computing device include: sending exhaustively (i.e., as soon as signatures are generated), periodically, upon request, or according to any other scheduling method, such as combining multiple scheduling methods to operate in parallel. The computing device receives data and respective signatures from the memory device and authenticates the data using the signatures. Similarly to embodiments that use non-secured external memory devices, received data can be stored in a cache prior or in parallel to being executed by the processing core, and re-fetching of data from the external device occurs upon a cache miss event.

System Description

FIG. 1 is a block diagram that schematically illustrates a secured computing system 20, in accordance with an embodiment of the present invention. In the example of FIG. 1, a secured computing device 24 communicates with a secured external device 26 and with a non-secured external device 28. Each of devices 26 and 28 comprises a respective memory 32A or 32B that stores data in basic units referred to as data items (which may alternatively be referred to as data blocks). Digital signatures that are calculated over the data items in device 28 are stored in memory 32B. Secured device 26 can similarly store signatures (not shown in the figure) calculated over data items in memory 32A. Alternatively or additionally, device 26 can generate signatures on the fly over signals such as data, address and/or control signals, that are communicated with computing device 24 as described further below.

In the description that follows and in the claims, the term "data items" may refer to data stored in a memory device (e.g., device 26 or 28) and/or to data, address, and/or control signals that are communicated between a secured memory device (e.g. device 26) and a computing device (e.g. device 24). A stored data item may comprise, for example, a program instruction or a data word. Additionally or alternatively a stored data item may comprise a group of program instructions and/or data words.

Computing device 24 is capable of processing data items sent by device 26 or 28 via a respective interface 36A or 36B. Device 24 receives the instructions via an input bridge 44 and executes the respective program.

In some embodiments, each of the external devices 26 or 28 stores one or more data items and one or more digital signatures in respective memory 36A or 36B. In some embodiments, signatures in external device 26 and 28 are pre-calculated and stored. Signatures can be calculated over the entire set of data items or over a subset thereof. For example, a signature can be calculated to sign a group of data items that comprise a subroutine of a computer program. Additionally or alternatively, signatures can be calculated over blocks of multiple data items of a suitable size. In some embodiments, all the data items are signed using a single key. In alternative embodiments, however, subsets of data items can be signed using different keys.

Keys for calculating the signatures can be programmed or otherwise stored in computing device 24 and/or in secured external device 26 by various means that are known in the art, such as (but not limited to) using a non-volatile memory (NVM), one time programmable (OTP) NVM, electric fuse burning, or physical unpredictable function (PUF, also referred to as physical unclonable function). Additionally, secured external device 26 can be paired with secured computing device 24 by programming each of devices 24 and 26 with a suitable respective shared key 42 in a secured environment, or by applying key exchange methods as are known in the art.

Device 26 further comprises a signature engine 40 that is capable of generating (on the fly) a signature over program instructions, data, control signals, and/or address signals that pass through interface 36A while communicating with secured device 24. Alternatively or additionally, signature engine 40 calculates one or more signatures over data items that are stored in memory 32A. Signatures generated by engine 40 can be stored locally in memory 32A and sent to computing device 24 upon request or using any other suitable scheduling method.

In some embodiments, part of or all the stored data items in external devices 26 and 28 are encrypted. In such embodiments, signature engine 40 may further comprise an encrypting cipher, and device 24 may further comprise a decrypting cipher. The decrypting cipher is provided with a key suitable to decrypt the encrypted data items prior to execution by a processing core 48 (described below).

Input bridge 44 serves as a bidirectional communication interface with external devices 26 and 28 and passes data items that it receives to a processing core 48. Processing core 48 typically comprises the main CPU of secured system 20, possibly additional processors, and bus masters to coordinate the core's internal and I/O activities.

A signature engine 56 in device 24 calculates signatures over received data items (and/or other data, address, and/or control signals) to validate the authenticity of the data items. When the validation fails, device 24 takes suitable measures to prevent leakage or exposure of secret information. The structure and functionality of computing device 24 are described below in detail with reference to FIG. 2.

In some embodiments, prior to calculating a signature by signature engine 56 or 40, the data to be signed is padded to a length that fits a suitable input size as specified for the signature calculating scheme in use.

Figure 2:
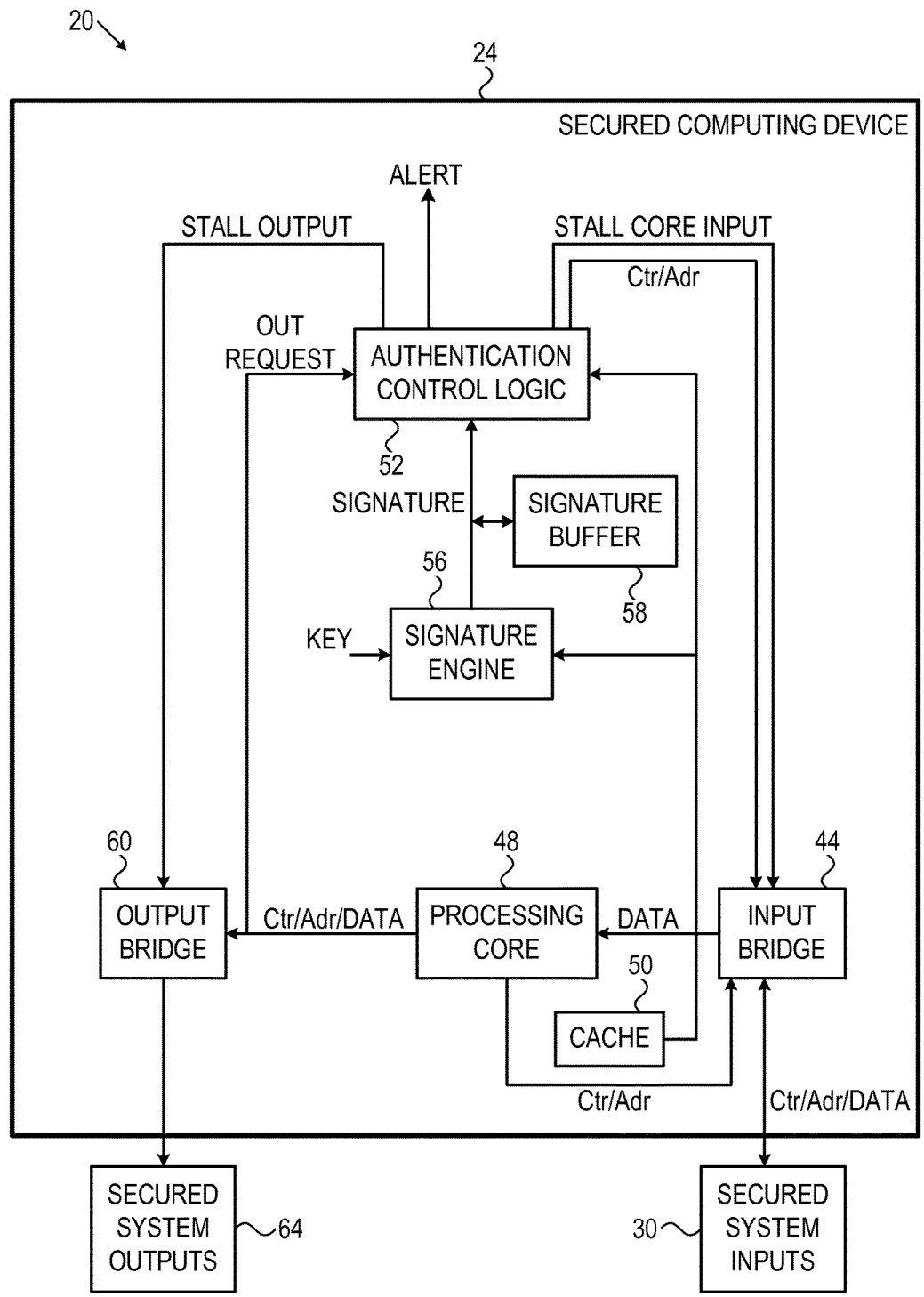
FIG. 2 is a block diagram that schematically shows details of the secured computing system of FIG. 1, in accordance with an embodiment of the present invention.

FIG. 2 is a block diagram that schematically shows details of secured computing system 20, in accordance with an embodiment of the present invention. In FIG. 2, secured computing device 24 communicates with an external device that is represented by a module referred to as secured system inputs 30. Secured system inputs 30 can comprise, for example, external device 26 or 28 of FIG. 1, a memory device, or any other suitable source of data items and respective signatures. In the description that follows, the terms "secured system inputs" and "external device" may be used interchangeably.

Device 24 generates control and addressing signals that are routed via input bridge 44 in order to access data stored in the memory of the external device. Processing core 48 generates control and addressing signals that are routed via input bridge 44 to read data items such as program instructions from the external device. Input bridge 44 accepts and delivers the data items to processing core 48 for execution.

In some embodiments, data items are cached in a local cache memory 50 prior to (or in parallel with) the delivery to the processing core.

The received data items are also input to authentication control logic 52 and to signature engine 56. Logic 52 and engine 56 may operate concurrently and asynchronously relative to core 48. Authentication logic 52 additionally reads the original signature of the data items as stored or generated in the external device, by generating suitable control and addressing signals that are routed via input bridge 44 to the external device. Alternatively, these signatures may be conveyed by inputs 30 to input bridge 44 automatically along with the data. Using the received data items and a respective key, engine 56 calculates a signature of the data items and sends the signature to authentication logic 52 for validation. Authentication logic 52 validates the authenticity and integrity of the received data items by seeking a match between the signature calculated by engine 56 and the original signature. In some embodiments, signature engine 56 calculates multiple signatures (e.g., signatures of multiple data items in a data block) and stores the signatures in a signature buffer 58. In such embodiments, authentication logic 52 may validate all pending signatures in the buffer before enabling input bridge 44 to input subsequent data items (or blocks). An alternative method for signature validation is described further below.

An output bridge 60 connects processing core 48 to secured system outputs 64, also referred to as an output channel. Secured system outputs 64 include any address space to which a write or read operation by processing core 48 may expose secured information, directly or indirectly, as well as any other sort of receiver that may receive signals from output bridge 60. Device 24 can statically configure the address space that corresponds to secured system outputs 64. Additionally or alternatively, the address space or parts thereof may change dynamically according to variations in the state and configuration of secured system 20.

In the description that follows and in the claims, a data item or a program instruction whose execution results in generation of a signal on output bridge 60 (which can be received or sensed by outputs 64) is referred to as an output instruction. In some embodiments, processing core 48 signals to authentication logic 52 an OUT REQUEST signal when executing an output instruction. Concomitantly, when enabled, the response of output bridge 60 to an output instruction is referred to as outputting a signal. Examples of output instructions whose execution may expose secured information to secured system outputs 64 include:

Writing to a non-volatile memory (NVM), and/or to a one-time programmable (OTP) memory.

Writing to an external interface, such as another chip in the system, a memory device, or general purpose I/O (GPIO) signals.

Accessing lock-bits, testing modes, clock configuration, and reset registers.

Accessing control and/or configuration registers of security accelerator modules (i.e., modules performing security functions such as computing AES, SHA1, SHA256, RSA, or ECC values) that may expose secret information and keys to an attacker using side channel attack techniques, such as power analysis or electromagnetic interference (EMI) analysis.

Figure 3:
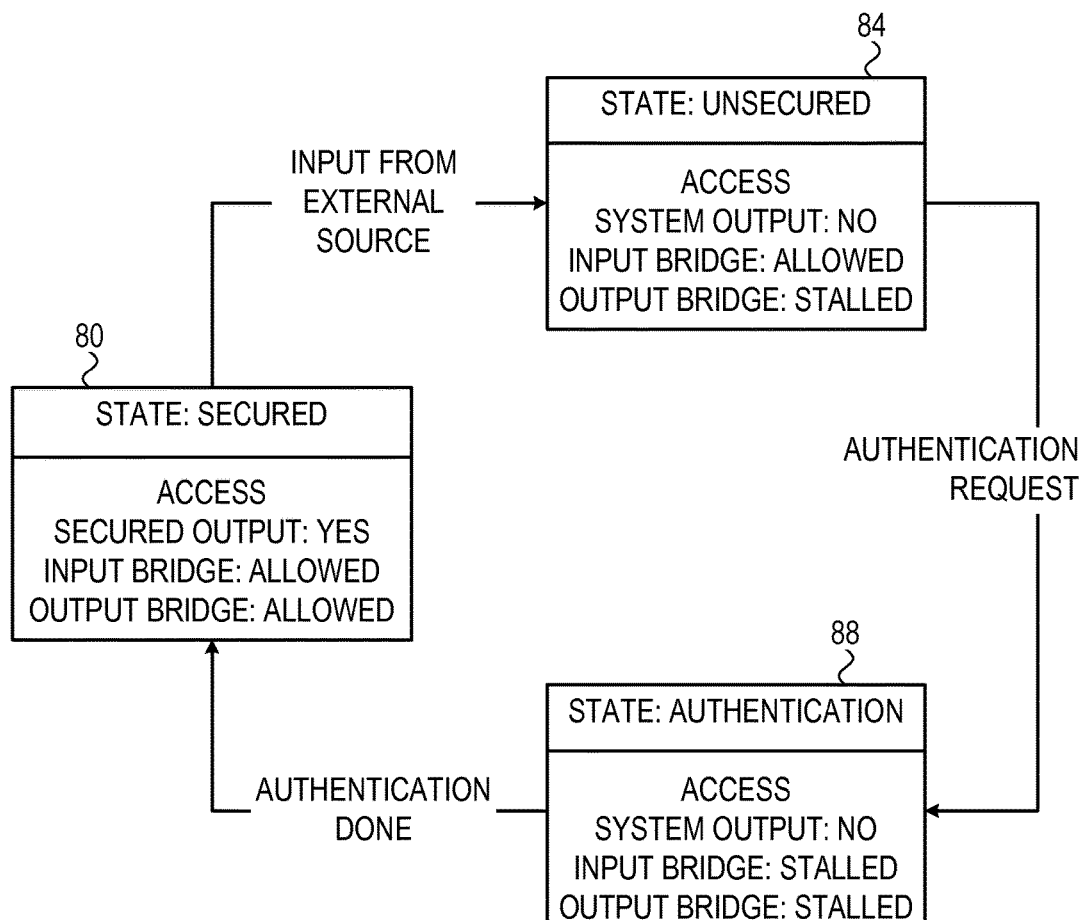
FIG. 3 is a diagram showing a security state-machine, in accordance with an embodiment of the present invention.

Input bridge 44 serves as an arbitrator between authentication control logic 52 and processing core 48. By default, processing core 48 gets a higher priority to fetch data items from the external device (30). When requested, however (e.g., when in authentication state as shown in FIG. 3 below), authentication logic 52 can stall input bridge 44 from fetching subsequent data items, or blocks of data items, by activating a STALL CORE INPUT signal, and take over input bridge 44 in order to read externally stored or generated signatures. In some embodiments, input of subsequent data blocks is inhibited until all the data items in previously fetched data blocks are authenticated. Additionally, authentication logic 52 can stall output bridge 60 and thus inhibit any access to secured outputs 64, by activating a STALL OUTPUT signal. The functionality of device 24, and specifically the use of these "STALL" functions in preventing exposure of secret data, is further described with reference to FIG. 3 below.

Whereas the signature validation techniques described above compare signatures computed by signature engine 56 with signatures received via input bridge 44, in alternative embodiments, signature validation may be based on the comparison of hash message digests. Algorithms for calculating signatures sometimes make use of hash and encryption functions.

In an example embodiment, in which computing device 24 communicates with secured device 26, a signature corresponding to certain data comprises a message digest calculated over that data using a hash function. The message digest may be calculated over one or more data items and/or data, address and/or control signals delivered over interface 36A. The message digest may be calculated on the fly and kept up to date by both devices 24 and 26. Secured external device 26 may schedule and send message digest signatures to secured computing device 24 exhaustively, periodically, or upon request raised by secured computing device 24. On the receipt of an updated message digest, authentication control logic 52 can compare the message digest calculated by device 26 to a message digest internally calculated over the received data by signature engine 56 and verify the authenticity of the signed data. Secret key 42, which is shared between devices 24 and 26, can be used as a seed for generating a pseudo-random sequence to be blended with the message digest data.

In alternative embodiments, instead of blending the message digest with a sequence that depends on a secret key, an encryption algorithm encrypts the message digest using a secret key to generate the signature. The recipient (e.g., secured computing device 24) receives the data and signature and decrypts the signature using a respective key to recover the original unencrypted message digest, as well as recalculating the message digest itself over the received message. If the original and the recalculated message digests match, the data can be assumed authentic. Examples of hash and encryption functions include, for example, the secure hash algorithm (SHA) SHA-1, and the advanced encryption algorithm (AES).

The configuration of computing device 24 and external devices 26 and 28 in FIGS. 1 and 2 is an example configuration, which is chosen purely for the sake of conceptual clarity. In alternative embodiments, any other suitable configuration can also be used. The different elements of computing device 24 and external devices 26 and 28 may be implemented using any suitable hardware, such as in an Application-Specific Integrated Circuit (ASIC) or Field-Programmable Gate Array (FPGA). In some embodiments, some elements of the computing device and the external devices can be implemented using software, or using a combination of hardware and software elements. For example, in the present embodiment, signature engine and authentication logic 52 can be implemented as dedicated hardware modules. As another example, signature calculations as well as encryption/decryption functions can be implemented in hardware within signature engines 56 and 40, in software to be executed by processing core 48, or in a combination of hardware and software.

Typically, processing core 48 in computing device 24 comprises at least one general-purpose computer processor, which is programmed in software to carry out the functions described herein. The software may be downloaded to the computing device in electronic form, over a network, for example, or it may, alternatively or additionally, be provided and/or stored on non-transitory tangible media, such as magnetic, optical, or electronic memory.

FIG. 3 is a diagram showing a security state-machine, in accordance with an embodiment of the present invention. Some security aspects and operational modes of device 24 are derived from the three states of the state-machine and defined transition rules among the states. In a secured state 80, a data item or instruction that is currently executed, as well as all previously executed data items received via input bridge 44, are already validated to be authentic by authentication logic 52. Secured state 80 is the only state (of the three states) in which device 24 is allowed to access secured system outputs 64. While in state 80, device 24 is also allowed to receive data items via input bridge 44. Upon receiving data items, the state-machine transitions into an unsecured state 84.

While in unsecured state 84, authenticity of at least part of any newly received data items is not yet validated, and device 24 is not allowed to access secured system outputs 64. In case processing core 48 encounters an output instruction, actual access to the output channel is delayed (i.e., output of the signal by output bridge 60 is delayed) until the output instruction is authenticated. While in unsecured state 84, however, processing core 48 can continue processing neutral data items that request no access to secured system outputs 64, even if these neutral data items are not yet authenticated.

Transition from unsecured state 84 to an authentication state 88 occurs upon authentication logic 52 receiving an AUTHENTICATION REQUEST signal. While in authentication state 88, authentication logic 52 stalls input bridge 44 from receiving data items and takes control over the input bridge to read original signatures from the external device (30). Authentication logic 52 compares the original signatures to signatures calculated by signature engine 56 to authenticate the data. As noted earlier, authentication logic 52 may asynchronously authenticate data items while processing core 48 is executing (possibly other) data items.

Various triggers can generate an AUTHENTICATION REQUEST signal that makes the state-machine transition into authentication state 88. Some example triggers are given hereinbelow:
- Activation of the OUT REQUEST signal when processing core 48 attempts to gain access to secured system outputs 64 and the device is not in secured state 80.
- Activation of the OUT REQUEST signal periodically, or after a predefined timeout since last visiting authentication state 88.
- When a memory space allocated for signatures pending for verification gets full. An example embodiment with an unsecured memory, which verifies multiple pending signatures, is described further below.
- When input bridge 44 is not occupied with delivering data items, and thus authentication logic 52 can retrieve signatures stored in secured input system inputs 30 via the input bridge.

When the data items are validated as authentic in state 88, the state-machine transitions back to secured state 80. Otherwise, authentication has failed and authentication logic 52 generates an alert signal.

Device 24 can take various measures in response to an alert signal in order to maintain a high security level. Example actions that device 24 can take in response to an alert signal include:
- Reset the secured environment.
- Erase secret data such as secret keys.
- Force device 24 to permanently terminate all operations, such as processing/authenticating data items, and to additionally stall the input and output bridges.
- The response level may depend on the number of authentication failure events. For example, secured device 24 can restart operation after recognizing a predefined number of authentication failure events, and respond more aggressively, for example, by deleting secured information or terminating all activities if an additional authentication failure occurs.

We now describe an example embodiment of secured system 20, wherein the external device comprises an unsecured memory device 28, such as an off-the-shelf non-volatile storage device. In the present example, the memory device stores data items that comprise computer program instructions (and possibly related data), to be executed by secured computing device 24. Device 28 can allocate any suitable share of the storage capacity for storing signatures. For example, 75% of the storage capacity may be used for user data and 25% for storing signatures. Signatures may be calculated (outside the memory device) over blocks of data items. For example, each 256-bit memory block may be signed with a 64-bit signature.

We assume in this example that secured device 24 is equipped with cache memory 50 having a cache line size of 256 bits. Data items read via input bridge 44 are stored in the cache prior or in parallel to being delivered for processing by processing core 48. On a cache miss event, computing device 24 fetches new data items into the cache. Execution of the program instructions by processing core 48 and calculating signatures by signature engine 56 for each 256-bit block can be carried out simultaneously. Device 24 can store multiple calculated signatures in signature buffer 58, thus enabling multiple data fetches before actually performing authenticity verification. Upon AUTHENTICATION REQUEST, processing core 48 halts and authentication logic 52 reads respective original signatures from external memory and compares the original to the calculated signatures. After all pending calculated signatures are verified, processing core 48 resumes execution.

The configuration of the above-described embodiment is an example configuration, and any other suitable configuration of input and memory elements can alternatively be used. For example, other data block sizes and signature sizes are also applicable. As another example, any suitable signature buffer size can also be used. In an example embodiment, 32-bit signatures are calculated over 128-bit data blocks. The data blocks are cached in a cache memory having a 128-bit cache line, and up to five non-validated signatures can be stored in a 160-bit signature buffer.

The configuration of the state-machine described with reference to FIG. 3 is an example configuration, which the inventor has found to be suitable for implementation. In alternative embodiments, any other suitable number of states and any suitable transition rules among the states can also be used.

Figure 4:
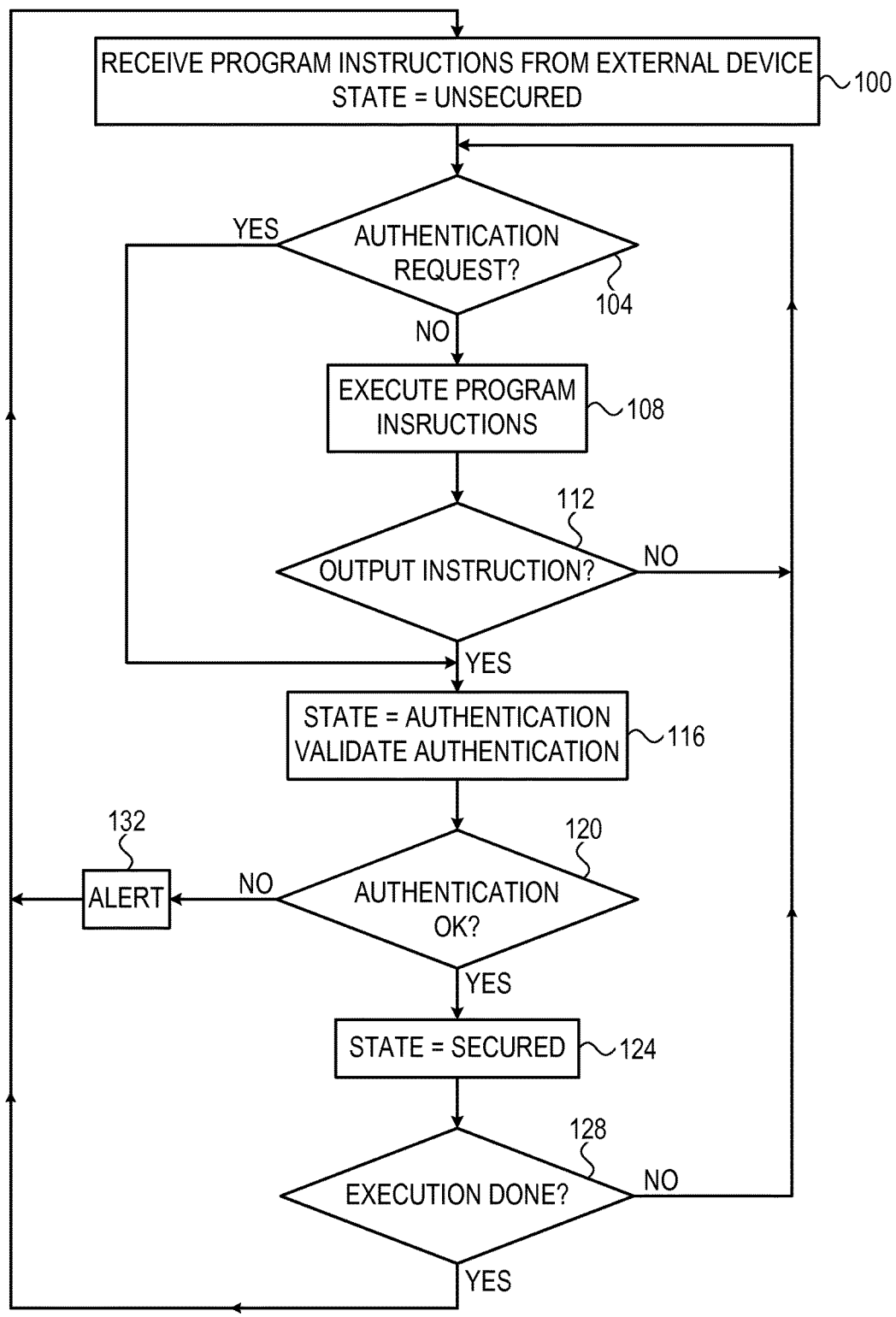
FIG. 4 is a flow chart that schematically illustrates a method for authentication in a secured computing device, in accordance with an embodiment of the present invention.

FIG. 4 is a flow chart that schematically illustrates a method for authentication that may be implemented in secured computing device 24, in accordance with an embodiment of the present invention. The method begins with device 24 receiving computer program instructions for execution by processing core 48 at a code reception step 100. Upon receiving the instructions via input bridge 44, device 24 transitions into unsecured state 84. Device 24 checks whether there is an authentication request pending at a request checking step 104. If at step 104 no authentication is required, processing core 48 executes the received program instructions at an execution step 108. Otherwise, device 24 proceeds to an authentication step 116 (described below).

While execution of instructions is carried out, device 24 checks whether processing core 48 is currently executing a neutral instruction or an instruction that requires access to secured system outputs 64, at an instruction checking step 112. As long as processing core 48 is executing a neutral instruction, device 24 loops back to step 104. Otherwise, it can be concluded that processing core 48 is trying to gain access to secured system outputs 64 by executing an output instruction, which has not yet been authenticated. Device 24 therefore proceeds to authentication step 116, in which device 24 transitions to authentication state 88. In this state, authentication control logic 52 halts execution of processing core 48, inhibits output bridge 60 by activating a STALL OUTPUT signal, and performs authentication validation by comparing calculated to original signatures as described above.

At an authentication verification step 120, device 24 checks whether a signature match was found at step 116. If the signatures match, device 24 transitions to secured state 80, at a secured state transition step 124, and processing core 48 resumes execution. While in secured state 80, device 24 is allowed to fetch program instructions from the external memory, and to safely access secured system outputs 64. If the authentication at step 120 fails, authentication logic 52 generates an alert signal, at an alerting step 132, and loops back to step 100 to fetch additional program instructions. Device 24 can respond to the alert signal in various ways, as described above.

Device 24 checks whether execution of all fetched instructions is done, at an execution checking step 128. If execution is done, device 24 loops back to step 100 to fetch subsequent program instructions. Otherwise, device 24 loops back to step 104 to check whether there is an authentication request pending.

The method of FIG. 4 is shown and described here by way of example, and alternative methods for accomplishing the purposes of this method are also within the scope of the present invention. For example, instead of halting processing core at step 116, the core may continue executing neutral instructions and/or delay the actual access to secured system outputs 64 until the output instruction has been authenticated.

Although the embodiments described herein mainly address authentication of data read from memory, the methods and systems described herein can also be used in other applications in which a computing device is to be protected against unauthorized output of sensitive information.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computing device, comprising:
   an input bridge, which is coupled to receive program instructions;
   one or more system outputs;
   an output bridge, having a first state in which output is allowed to pass through the output bridge from the processing core to the one or more system outputs, and a second state in which the output bridge is stalled in a manner inhibiting output from the processing core to the one or more system outputs;
   a processing core, which is coupled to receive the program instructions from the input bridge and execute the program instructions, wherein the program instructions include both program instructions which are capable of outputting signals through the output bridge and program instructions that do not send data to the one or more system outputs, and wherein the processing core can execute program instructions that do not send data to the one or more system outputs both when the output bridge is in the first state and when the output bridge is in the second state; and
   authentication logic, which is coupled to receive and authenticate the program instructions while the processing core executes the program instructions, and to entirely inhibit output of signals through the output bridge until it has been determined that the received program instructions that are capable of outputting signals through the output bridge have been authenticated.

2. The device according to claim 1, wherein the authentication logic is configured to authenticate the program instructions asynchronously with execution of the program instructions by the processing core.

3. The device according to claim 1, wherein the authentication logic is configured to authenticate at least some received program instructions after the program instructions have been executed by the processing core.

4. The device according to claim 1, wherein the authentication logic is configured to authenticate the program instructions by calculating one or more digital signatures of the program instructions and comparing the calculated signatures to respective original signatures received by the device via the input bridge.

5. The device according to claim 4, wherein the authentication logic is configured to generate an alert signal if at least one of the calculated signatures does not match the respective original signature.

6. The device according to claim 4, wherein after receiving a first block of program instructions, the input bridge is configured to allow receiving a second block of program instructions only after all the program instructions of the first block were authenticated by the authentication logic.

7. The device according to claim 1, wherein the device is configured to determine whether instructions to be executed are capable of outputting data and to determine whether instructions were authenticated and wherein when the processing core is set to execute an unauthenticated instruction capable of outputting data, the processing core is stalled until the unauthenticated instruction capable of outputting data is authenticated.

8. The device according to claim 1, wherein the device is configured to determine whether instructions to be executed are capable of outputting data and to determine whether instructions were authenticated and wherein when the processing core is set to execute an unauthenticated instruction capable of outputting data, the processing core delays execution of the output and continues with executing instructions incapable of outputting data.

9. The device according to claim 1, and comprising a cache in which program instructions received through the input bridge are stored and wherein upon a cache miss event, a plurality of blocks of program instructions, having respective signatures are fetched through the input bridge.

10. The device according to claim 1, wherein the authentication logic is configured to operate when the input bridge is not being used by the processing core.

11. The device according to claim 1, wherein the authentication logic is configured to inhibit outputting signals through the output bridge when the processing core encounters an unauthenticated output program instruction.

12. The device according to claim 1, wherein the authentication logic is configured to inhibit outputting signals through the output bridge upon receiving program instructions through the input bridge.

13. The device according to claim 1, wherein the authentication logic is configured to cancel the inhibiting of output of signals through the output bridge upon completion of authentication of the program instructions received through the input bridge.

14. A method, comprising:
receiving in a computing device via an input bridge a sequence of program instructions for execution by a processing core of the device;
executing the program instructions by the processing core; and
authenticating the program instructions using authentication logic while the processing core executes the program instructions, and entirely inhibiting output from the processing core until it has been determined that the received program instructions that are capable of outputting signals from the computing device have been authenticated,
wherein the executed program instructions include both program instructions which are capable of outputting signals from the processing core and program instructions that do not output signals from the processing core, and wherein the processing core can execute program instructions that do not output signals from the processing core both in a first state in which output from the processing core is allowed and in a second state in which output from the processing core is inhibited.

15. The method according to claim 14, wherein authenticating the program instructions comprises authenticating the program instructions asynchronously with execution of the program instructions by the processing core.

16. The method according to claim 14, wherein authenticating the program instructions comprises authenticating at least some received program instructions after the program instructions have been executed by the processing core.

17. The method according to claim 14, wherein authenticating the program instructions comprises calculating one or more digital signatures of the program instructions and comparing the calculated signatures to respective original signatures received by the device via the input bridge.

18. The method according to claim 17, wherein authenticating the data items comprises generating an alert signal if at least one of the calculated signatures does not match the respective original signature.

19. The method according to claim 17, wherein receiving the sequence of program instructions comprises receiving first and second blocks of program instructions, wherein receiving the second block is enabled only after authenticating all the program instructions of the first block using the authentication logic.

20. A computing system, comprising:
an external device, which is configured to provide a sequence of program instructions; and
a computing device comprising:
an input bridge, which is coupled to receive from the external device the sequence of program instructions;
one or more system outputs;
an output bridge, having a first state in which output is allowed to pass through the output bridge from the processing core to the one or more system outputs, and a second state in which the output bridge is stalled in a manner inhibiting output from the processing core to the one or more system outputs;
a processing core, which is coupled to receive the program instructions from the input bridge and execute the program instructions, wherein the program instructions include both program instructions which are capable of outputting signals through the output bridge and program instructions that do not send data to the one or more system outputs, and wherein the processing core can execute program instructions that do not send data to the one or more system outputs both when the output bridge is in the first state and when the output bridge is in the second state; and
authentication logic, which is coupled to receive and authenticate the program instructions while the processing core executes the program instructions, and to entirely inhibit output of signals through the output bridge until it has been determined that the received program instructions that are capable of outputting signals through the output bridge have been authenticated.

21. The system according to claim 20, wherein the external device comprises a memory device which is configured to store the program instructions and authentication information, and wherein the computing device further comprises a signature engine which is configured to generate at least some of the authentication information.

22. The system according to claim 20, wherein the external device comprises a secured memory device which is configured to generate at least some of the authentication information.

23. The system according to claim 22, wherein the secured memory device is configured to generate authentication information on the fly over at least some of the program instructions that are communicated by the secured memory device to the computing device, and wherein the authentication logic is configured to authenticate the program instructions using the authentication information.

24. The system according to claim 22, wherein the secured memory device comprises a non-volatile memory.

* * * * *